US012522060B2

United States Patent
Nukumi et al.

(10) Patent No.: US 12,522,060 B2
(45) Date of Patent: Jan. 13, 2026

(54) DOOR WEATHER STRIP FOR AUTOMOBILE

(71) Applicant: NISHIKAWA RUBBER CO., LTD., Hiroshima (JP)

(72) Inventors: Kenta Nukumi, Hiroshima (JP); Yuzo Hirakawa, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 439 days.

(21) Appl. No.: 18/192,912

(22) Filed: Mar. 30, 2023

(65) Prior Publication Data

US 2023/0347723 A1    Nov. 2, 2023

(30) Foreign Application Priority Data

Apr. 29, 2022 (JP) .................................. 2022-075523
Dec. 1, 2022 (JP) .................................. 2022-192523

(51) Int. Cl.
   *B60J 10/242* (2016.01)
   *B60J 10/25* (2016.01)
   *B60J 10/277* (2016.01)

(52) U.S. Cl.
   CPC ............ *B60J 10/242* (2016.02); *B60J 10/25* (2016.02); *B60J 10/277* (2016.02)

(58) Field of Classification Search
   CPC ........ B60J 10/242; B60J 10/277; B60J 10/86; B60J 10/24
   See application file for complete search history.

(56) References Cited

U.S. PATENT DOCUMENTS

2009/0100761 A1    4/2009   Hashimoto et al.
2018/0065455 A1    3/2018   Ogawa

FOREIGN PATENT DOCUMENTS

| JP | S60-156018 U  | 10/1985 |
| JP | S60-193745 A  | 10/1985 |
| JP | S60-206723 A  | 10/1985 |
| JP | H07-008637 B2 | 2/1995  |
| JP | H107-024596 U | 5/1995  |

(Continued)

OTHER PUBLICATIONS

JP2011126347A English translation from WIPO (Year: 2011).*

(Continued)

*Primary Examiner* — Daniel J Troy
*Assistant Examiner* — Susan M. Heschel
(74) *Attorney, Agent, or Firm* — Rankin, Hill & Clark LLP (57) ABSTRACT

A door weather strip for an automobile couples to a flange of a door of the automobile. The door weather strip includes an installation base member, a hollow seal member, an air vent, and a sponge layer. The installation base member couples to the flange. The hollow seal member is integrally molded with the installation base member, and makes elastic contact with an automobile body of the automobile when the door is in a closed position. The hollow seal member includes a first wall, a second wall, a third wall, and a fourth wall. The air vent is provided on the hollow seal member, and is used to release air from the hollow seal member. The sponge layer is provided on an inner peripheral surface of the hollow seal member except the air vent, and has a specific gravity lower than the first, second, third, and fourth walls.

4 Claims, 12 Drawing Sheets

(56) References Cited

FOREIGN PATENT DOCUMENTS

| | | | |
|---|---|---|---|
| JP | 2000-272353 A | 10/2000 | |
| JP | 2004-058819 A | 2/2004 | |
| JP | 2009-096455 A | 5/2009 | |
| JP | 2011-011602 A | 1/2011 | |
| JP | 2011126347 A * | 6/2011 | |
| JP | 2012-011908 A | 1/2012 | |
| JP | 2013-136661 A | 7/2013 | |
| JP | 5626310 B2 * | 11/2014 | ............. B60J 10/25 |
| JP | 2018-039499 A | 3/2018 | |
| JP | 2021-046099 A | 3/2021 | |
| KR | 1020080104498 B1 * | 4/2009 | |
| KR | 102163019 B1 * | 10/2020 | ............ B60J 10/242 |

OTHER PUBLICATIONS

KR100892488B1 English translation from WIPO (Year: 2009).*
KR102163019B1 English translation from WIPO (Year: 2020).*
JP5626310B2 English translation from WIPO (Year: 2014).*

* cited by examiner

DOOR WEATHER STRIP FOR AUTOMOBILE

REFERENCE TO RELATED APPLICATIONS

This application claims the benefit under 35 USC § 119 of JP Patent Applications JP 2022-075523 filed Apr. 29, 2022 and JP 2022-192523 filed Dec. 1, 2022, the entire disclosure of which is incorporated herein by reference.

BACKGROUND OF THE INVENTION

The present invention relates to a door weather strip for an automobile, which couples to a flange of a door of an automobile. The door weather strip makes elastic contact with an automobile body of the automobile, to seal a gap between an interior and an exterior of the automobile when the door is in a closed position.

Figure 7:
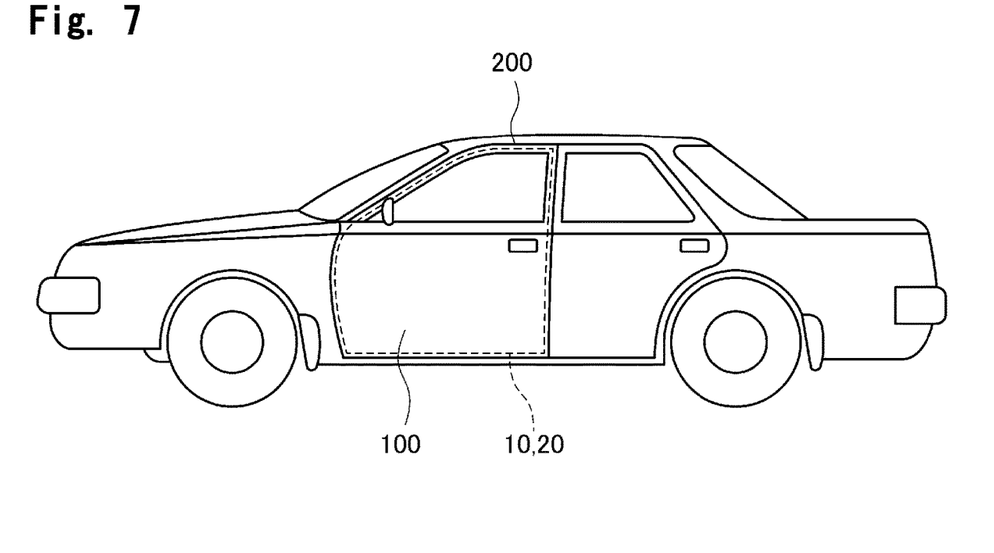
FIG. 7 is an external side view of the automobile.
Figure 8:
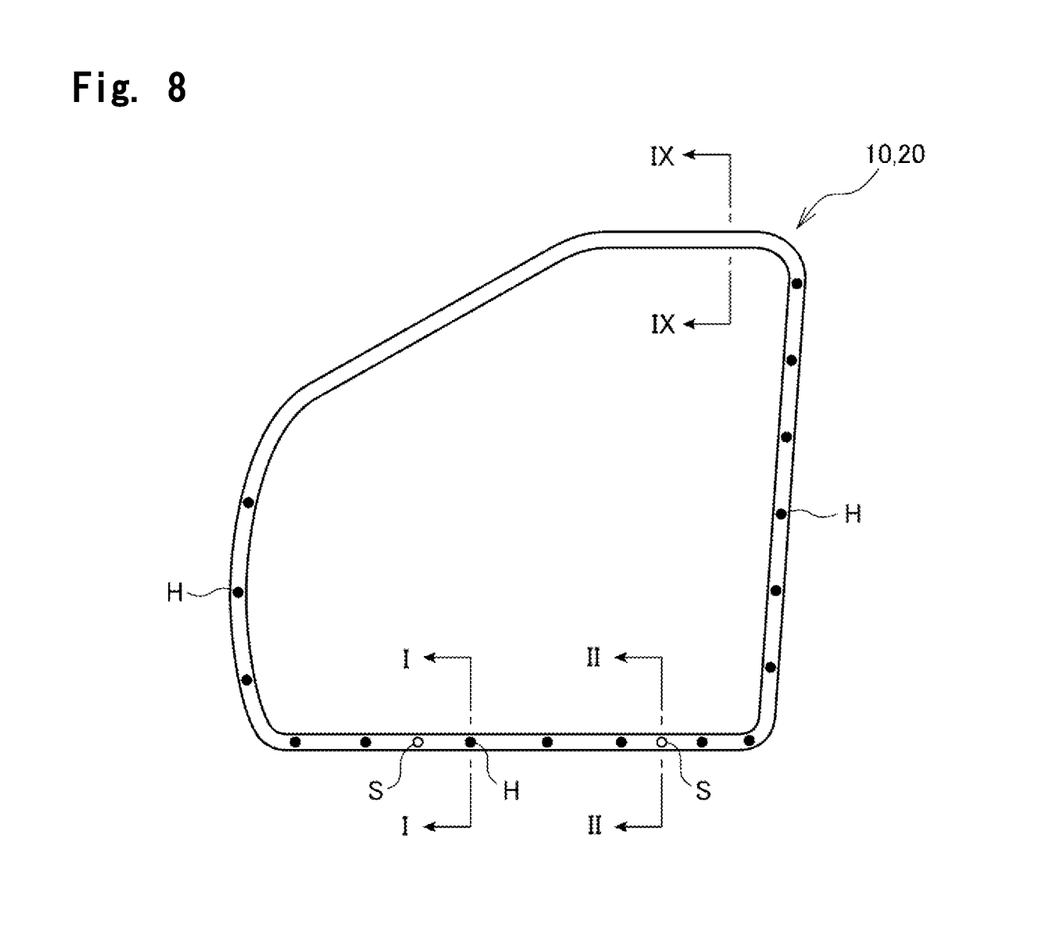
FIG. 8 is an enlarged side view of the door weather strip that couples to the automobile illustrated in FIG. 7.

As illustrated in FIGS. 7 and 8, a door weather strip 10 for an automobile couples to a flange of a peripheral edge of a door 100 of the automobile. The door weather strip 10 makes elastic contact with an automobile body 200 of the automobile opposite the door 100 when the door 100 is in a closed position.

Figure 9:
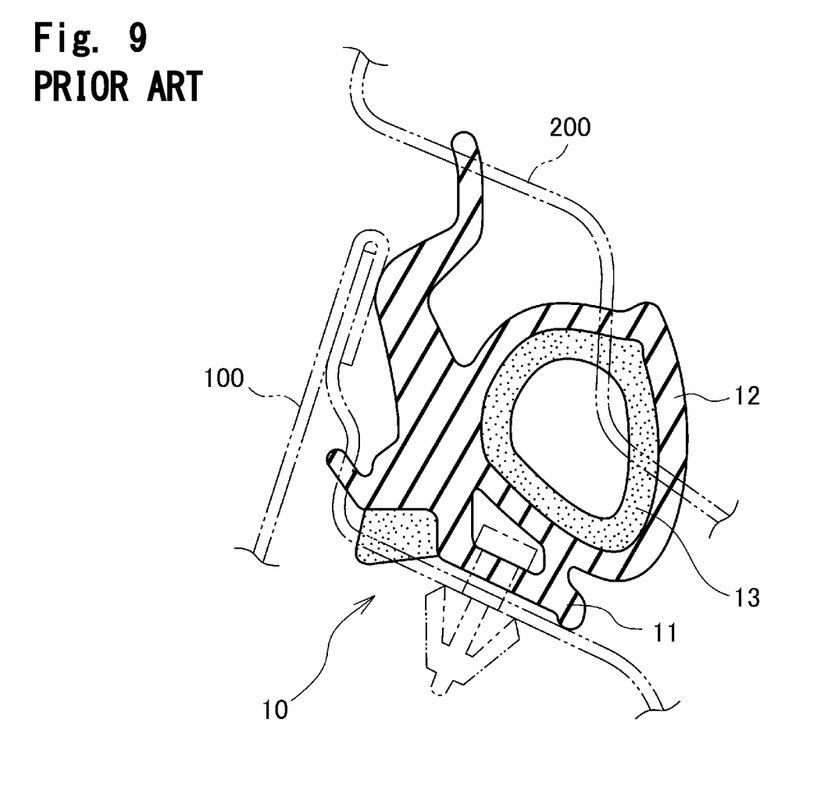
FIG. 9 is an enlarged vertical cross-sectional view of a conventional door weather strip for an automobile taken along line IX-IX in FIG. 8.

As illustrated in FIG. 9, the door weather strip 10 includes an installation base member 11 and a hollow seal member 12. The installation base member 11 couples to the flange. The hollow seal member 12 is integrally molded with the installation base member 11 and makes elastic contact with the automobile body 200. In this connection, Japanese Unexamined Patent Application Publication No. 2004-058819 is directed to a sponge material 13, which is highly foamed and has a lower specific gravity, provided on an inner peripheral surface of the hollow seal member 12, to improve noise insulation performance.

Japanese Examined Patent Publication No. 7-008637 is directed to the hollow seal member 12 with air vents H provided at intervals, which are used to release air from the hollow seal member 12 and to suppress increase in closing force required for closing the door 100. Japanese Unexamined Patent Application Publication No. 2021-046099 is directed to the hollow seal member 12 with drainage holes S used to drain water from the hollow seal member 12.

In FIG. 8, the air vents H are omitted from parts that couple to a roof side part of the door 100 and part that inclines toward a front part from the roof side part, and the drainage holes S are provided on part that couples to a lower side part of the door 100. Alternatively, the air vents H may be provided around the whole circumference of the door weather strip 10.

Providing the sponge material 13, illustrated in FIG. 9, increases compressive load applied on the hollow seal member 12 and requires for the air vents H on the hollow seal member 12. Drilling the air vents H in the hollow seal member 12 with the sponge material 13, disclosed in Japanese Examined Patent Publication No. 7-008637, however, leaves shavings in the hollow seal member 12, and removing the shavings requires an extra time and decreases work efficiency.

In drilling the air vents H in the hollow seal member 12 with the sponge material 13, which is softer than ordinary sponge material having normal specific gravity, part of the sponge material 13 is easier to cling to cutting blades including drills as well as the shavings are easier to remain in the hollow seal member 12. This hampers formation of the air vents H having a perfectly circular shape.

To solve the above problems, it is an object of the present invention to provide a door weather strip that is improved in noise insulation performance and door closability, prevents the shavings, and keeps shape of the holes perfectly circular.

SUMMARY OF THE INVENTION

To achieve the above object, an aspect of the present invention provides a door weather strip (20) for an automobile. The door weather strip (20) couples to a flange of a door (100) of the automobile. The door weather strip (20) includes an installation base member (21), a hollow seal member (22), an air vent (H), and a sponge layer (30).

The installation base member (21) couples to the flange.

The hollow seal member (22) is integrally molded with the installation base member (21). The hollow seal member (22) makes elastic contact with an automobile body (200) of the automobile when the door (100) is in a closed position. The hollow seal member (22) includes a first wall (22A) curved toward an exterior of the automobile, a second wall (22B) curved toward an interior of the automobile, a third wall (22C) which connects top ends of the first and second walls (22A, 22B), and a fourth wall (22D) which connects base roots of the first and second walls (22A, 22B).

The air vent (H) is provided on the hollow seal member (22). The air vent (H) is used to release air from the hollow seal member (22).

The sponge layer (30) is provided on an inner peripheral surface of the hollow seal member (22) except the air vent (H). The sponge layer (30) has a specific gravity lower than the first, second, third, and fourth walls (22A, 22B, 22C, 22D).

In addition, according to an aspect of the present invention, the air vent (H) is provided on part of the second wall (22B) closer to the fourth wall (22D), and the sponge layer (30) is provided on the first wall (22A), the third wall (22C), and part of the second wall (22B) closer to the third wall (22C).

In addition, an aspect of the present invention provides a door weather strip (20) for an automobile. The door weather strip (20) couples to a flange of a door (100) of the automobile. The door weather strip (20) includes an installation base member (21), a hollow seal member (22), an air vent (H), a drainage hole (S), and a sponge layer (30).

The installation base member (21) couples to the flange.

The hollow seal member (22) is integrally molded with the installation base member (21). The hollow seal member (22) makes elastic contact with an automobile body (200) of the automobile when the door (100) is in a closed position. The hollow seal member (22) includes a first wall (22A) curved toward an exterior of the automobile, a second wall (22B) curved toward an interior of the automobile, a third wall (22C) which connects top ends of the first and second walls (22A, 22B), and a fourth wall (22D) which connects base roots of the first and second walls (22A, 22B).

The air vent (H) is provided on the hollow seal member (22). The air vent (H) is used to release air from the hollow seal member (22).

The drainage hole (S) is provided on the hollow seal member (22). The drainage hole (S) is used to drain water from the hollow seal member (22).

The sponge layer (30) is provided on an inner peripheral surface of the hollow seal member (22) except the air vent (H) and the drainage hole (S). The sponge layer (30) has a specific gravity lower than the first, second, third, and fourth walls (22A, 22B, 22C, 22D).

In addition, according to an aspect of the present invention, the air vent (H) is provided on part of the second wall (22B) closer to the fourth wall (22D), the drainage hole (S) is provided on part of the first wall (22A) closer to the third wall (22C), and the sponge layer (30) is provided on part of the first wall (22A) closer to the fourth wall (22D) and between the air vent (H) and the drainage hole (S).

In addition, according to an aspect of the present invention, a thickness of the sponge layer (30) is gradually reduced toward the air vent (H) or the drainage hole (S).

Symbols in parentheses show constituents or items corresponding to the drawings.

According to the present invention, the sponge layer that has the specific gravity lower than the first, second, third, and fourth walls is provided on the inner peripheral surface of the hollow seal member, to improve noise insulation performance.

In addition, the sponge layer is provided on the inner peripheral surface of the hollow seal member except the air vent, not the whole circumference of the inner peripheral surface. This prevents increase in compressive load and degradation in door closability. Omission of the sponge layer on the air vent leaves no shavings when the air vent is drilled. This provides the door weather strip improved in quality of the shape of the air vent and eliminates the need for removal of the shavings.

In addition, the air vent is provided on the part of the second wall closer to the fourth wall, and the sponge layer is provided on the first wall, the third wall, and the part of the second wall closer to the third wall, not on the fourth wall. This prevents increase in compressive load and improves door closability. Omission of the sponge layer on the fourth wall leaves no shavings that have remained in the hollow seal member if the sponge layer is provided on the inner peripheral surface of the fourth wall and an edge of the drill touches the sponge layer on the fourth wall to drill the air vent H.

In addition, the air vent and the drainage hole are provided on the hollow seal member, and the sponge layer that has the specific gravity lower than the first, second, third, and fourth walls is provided on the inner peripheral surface of the hollow seal member except the air vent and the drainage hole. Omission of the sponge layer on the air vent and the drainage hole leaves no shavings when the air vent or the drainage hole is drilled. Also, this improves the noise insulation performance and the door closability.

The sponge layer is provided preferably on the part of the first wall closer to the fourth wall and between the air vent and the drainage hole with the air vent provided on the part of the second wall closer to the fourth wall and the drainage hole provided on the part of the first wall closer to the third wall.

In addition, the thickness of the sponge layer is gradually reduced toward the air vent or the drainage hole. This controls strips or grooves on an outer surface of the hollow seal member under extrusion molding of the door weather strip that have appeared if the sponge layer abruptly disappears without a gradual reduction in thickness, to improve appearance. Also, this prevents a steep change in compressive load applied on the hollow seal member, to provide a favorable sealing function.

DETAILED DESCRIPTION

Referring to FIGS. 1 to 3, 7, and 8, a door weather strip 20 according to an embodiment of the present invention for an automobile will be described. When constituents or items correspond to those in prior arts, the same symbols are used.

Figure 1:
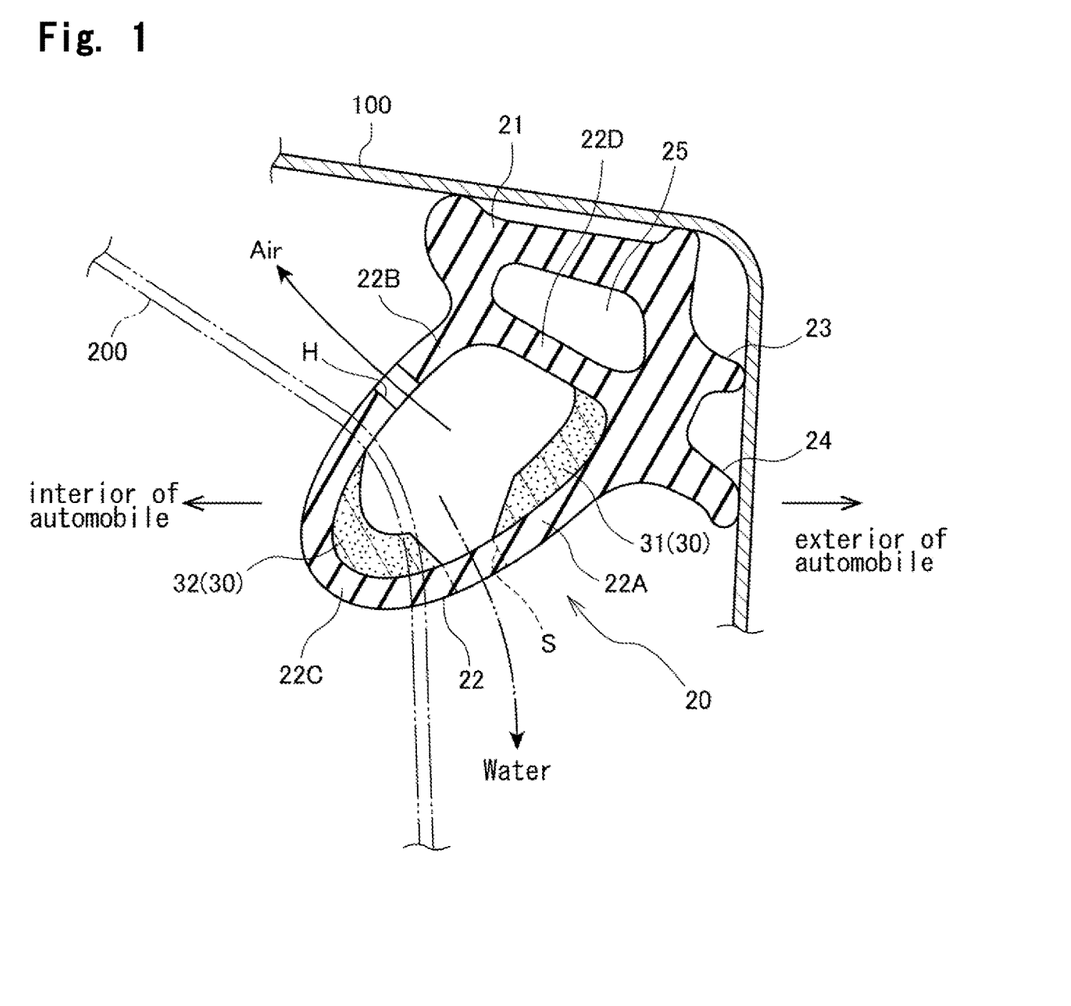
FIG. 1 is an enlarged vertical cross-sectional view of a door weather strip according to an embodiment of the present invention for an automobile taken along line I-I in FIG. 8.
Figure 2:
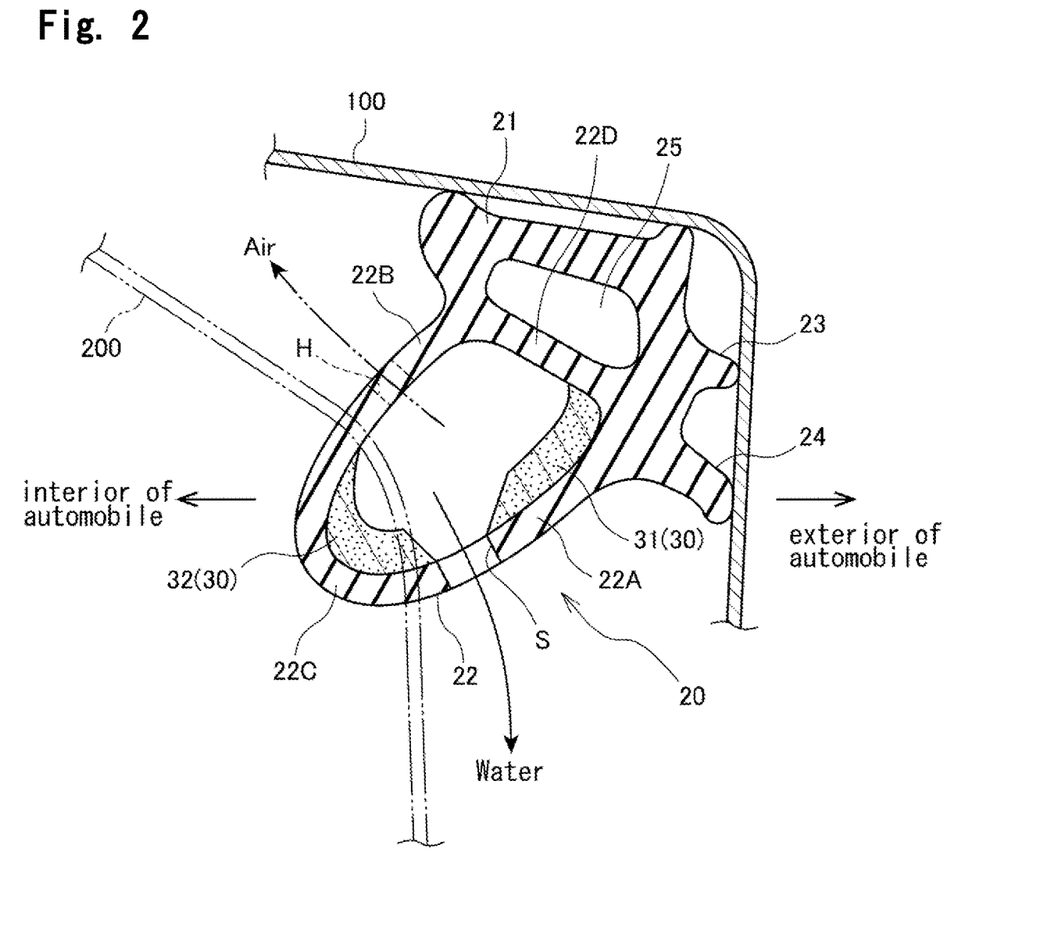
FIG. 2 is an enlarged vertical cross-sectional view of the door weather strip taken along line II-II in FIG. 8.
Figure 3:
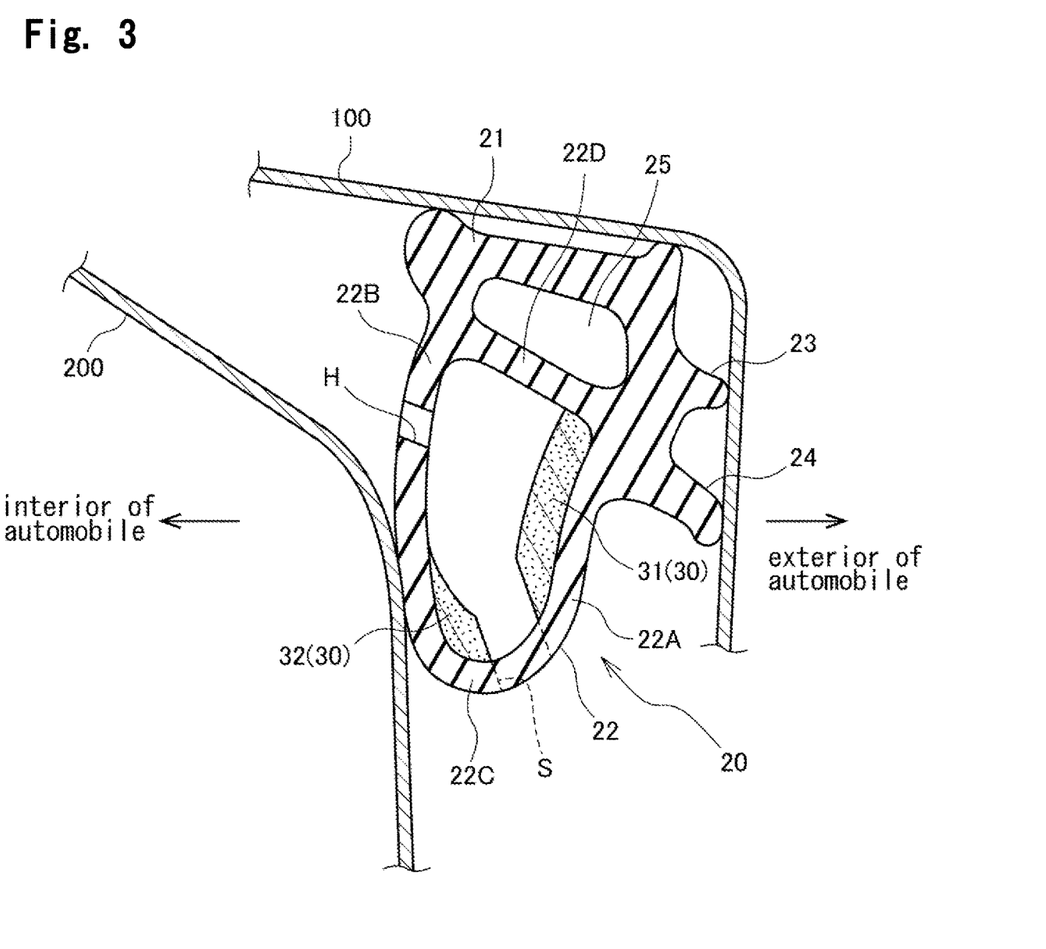
FIG. 3 is an enlarged vertical cross-sectional view of the door weather strip taken along line I-I in FIG. 8 making elastic contact with a door.

The door weather strip 20 couples to a flange along a whole circumference of a door 100, a front door in this embodiment, of the automobile. The door weather strip 20 includes an installation base member 21, a hollow seal member 22, a first lip 23, a second lip 24, a hollow part 25, an air vent H, a drainage hole S, and a sponge layer 30. The installation base member 21 couples to the flange. The hollow seal member 22 is integrally molded with the installation base member 21. The hollow seal member 22 makes elastic contact with an automobile body 200 of the automobile, to seal a gap between an interior and an exterior of the automobile when the door 100 is in a closed position. The automobile body 200 is opposite the door 100. The first lip 23 is provided on an outer-cabin side of the installation base member 21, and the second lip 24 is provided on the outer-cabin side of the hollow seal member 22. The first and second lips 23, 24 make elastic contact with the door 100. The hollow part 25 is provided between the installation base member 21 and the hollow seal member 22, and is used to store a head of a clip (illustration omitted) that is used to fix the door weather strip 20 on the door 100.

In this embodiment, an "inner-cabin side" or "interior of automobile" indicates a position closer to the automobile body 200 opposite the door 100 in the closed position, and an "outer-cabin side" or "exterior of automobile" is opposite the "inner-cabin side" or "interior of automobile".

The door weather strip 20 includes a plurality of extrusion-molded parts joined together on corner parts by die molding (illustration omitted), to have a circular shape. The door weather strip 20 illustrated in FIG. 8 has air vents H, black dots in FIG. 8, provided on parts that couple to a front part of the door 100, a rear part, and a lower side part at regular intervals, substantially 100 mm in this embodiment, to release air from the hollow seal member 22. Alternatively, the air vents H may be provided around the whole circumference of the door weather strip 20.

The door weather strip 20 has a plurality of, two in this embodiment, drainage holes S, white dots in FIG. 8, provided on the part that couples to the lower side part of the door 100 at a predetermined interval, 300 mm in this embodiment, to drain water from the hollow seal member 22.

The air vents H and the drainage holes S are shifted far enough to be out of overlap in an upper-lower direction. FIG. 1 is a vertical cross-sectional view of the door weather strip 20 taken along the air vent H. FIG. 2 is a vertical cross-sectional view of the door weather strip 20 taken along the drainage hole S. In this embodiment, the drainage holes S have a diameter of substantially 5 mm, and the air vents H have a smaller diameter of substantially 3 mm than the drainage holes S.

As illustrated in FIG. 1, the hollow seal member 22 includes a first wall 22A, a second wall 22B, a third wall 22C, and a fourth wall 22D. The first wall 22A is curved to protrude toward the exterior of the automobile. The second wall 22B is curved to protrude toward the interior of the automobile. The third wall 22C connects top ends of the first and second walls 22A, 22B. The fourth wall 22D connects base roots of the first and second walls 22A, 22B. As illustrated in FIG. 1, the air vent H is provided on part of the second wall 22B closer to the fourth wall 22D. As illustrated in FIG. 2, the drainage hole S is provided on part of the first wall 22A closer to the third wall 22C.

The sponge layer 30 is provided on an inner peripheral surface of the hollow seal member 22 except the air vent H and the drainage hole S. The sponge layer 30 has a specific gravity lower than the first, second, third, and fourth walls 22A, 22B, 22C, 22D.

The sponge layer 30 includes a first sponge layer 31 and a second sponge layer 32. The first sponge layer 31 is provided on part of the first wall 22A closer to the fourth wall 22D of the hollow seal member 22 in cross section. More specifically, the first sponge layer 31 extends between where the first wall 22A connects with the fourth wall 22D and the middle of the first wall 22A, that is, substantially half a distance from the fourth wall 22D connected to the first wall 22A to the third wall 22C connected to the first wall 22A. The second sponge layer 32 extends between the air vent H and the drainage hole S, that is, between part of the third wall 22C closer to the first wall 22A and part of the third wall 22C closer to the second wall 22B with the third wall 22C at a center of the hollow seal member 22 in cross section. The first and second sponge layers 31, 32 are formed by extrusion molding simultaneously with the door weather strip 20.

Figure 4:
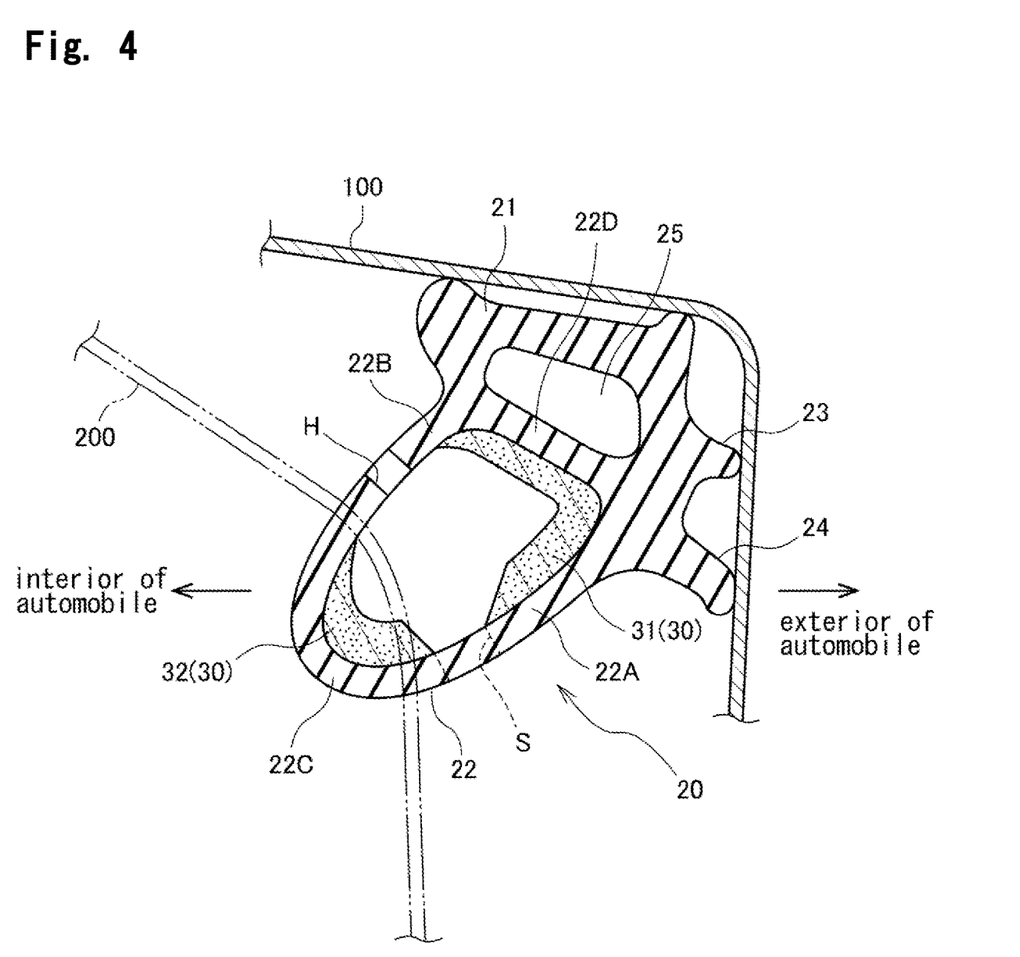
FIG. 4 is an enlarged vertical cross-sectional view of a door weather strip according to another embodiment of the present invention for an automobile taken along line I-I in FIG. 8.

While in this embodiment the sponge layer 30 is omitted between the air vent H and part of the fourth wall 22D in front of the first sponge layer 31 as illustrated in FIG. 1, the first sponge layer 31 may be extended toward the second wall 22B, to cover an inner peripheral surface of the fourth wall 22D as illustrated in FIG. 4.

The first sponge layer 31 that fails to cover the whole inner peripheral surface of the fourth wall 22D prevents increase in load applied on the hollow seal member 22 and leaves no shavings in the hollow seal member 22. The load has increased and the shavings have remained if the first sponge layer 31 is provided on the whole inner peripheral surface of the fourth wall 22D as illustrated in FIG. 4 and an edge of a drill touches the first sponge layer 31 to drill the air vent H.

Figure 5:
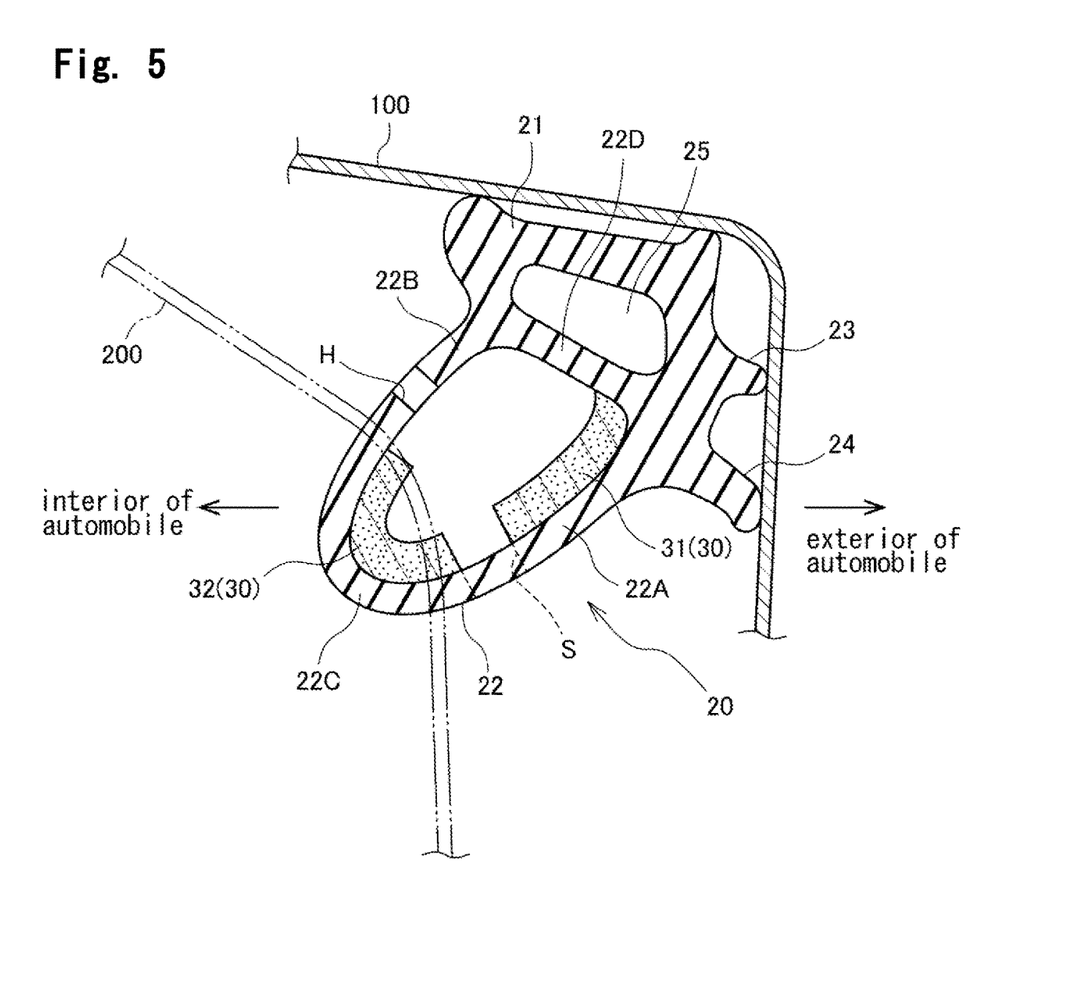
FIG. 5 is an enlarged vertical cross-sectional view of a door weather strip according to still another embodiment of the present invention for an automobile taken along line I-I in FIG. 8.

While in this embodiment, a thickness of the first and second sponge layers 31, 32 is gradually reduced toward the air vent H and the drainage hole S as illustrated in FIG. 1, the first and second sponge layers 31, 32 may be cut out perpendicularly on an end surface, to have a uniform thickness as illustrated in FIG. 5.

The gradually-reduced thickness of the first and second sponge layers 31, 32 toward the air vent H and the drainage hole S controls strips or grooves on an outer surface of the hollow seal member 22 under extrusion molding of the door weather strip 20 that have appeared if the first and second sponge layers 31, 32 abruptly disappear as illustrated in FIG. 5, to improve appearance. Also, this prevents a steep change in compressive load applied on the hollow seal member 22, to provide a favorable sealing function.

In this embodiment, the hollow seal member 22, which includes the first, second, third, and fourth walls 22A, 22B, 22C, 22D, is formed by a first sponge material, and the sponge layer 30, which includes the first and second sponge layers 31, 32, is formed by a second sponge material. The first sponge material has a specific gravity that falls within a range of 0.45 to 0.6, and the second sponge material has a lower specific gravity that falls within a range of 0.1 to 0.3 than the first sponge material, to suppress increase in door closing force. Alternatively, the first sponge material may have a lower specific gravity that falls within a range of 0.3 to 0.45, to lower the load and to reduce door closing force further.

In this embodiment, the sponge layer 30, which includes the first and second sponge layers 31, 32 and has the specific gravity lower than the first, second, third, and fourth walls 22A, 22B, 22C, 22D, is provided on the inner peripheral surface of the hollow seal member 22, to improve noise insulation performance.

In addition, the sponge layer 30 is provided on the inner peripheral surface of the hollow seal member 22 except the air vent H and the drainage hole S, not the whole circumference of the inner peripheral surface as illustrated in FIG. 9. This prevents increase in compressive load and degradation in door closability. Omission of the sponge layer 30 on the air vent H and the drainage hole S hardly leaves shavings when the air vent H and the drainage hole S are drilled. This provides the door weather strip 20 improved in quality of the shape of the air vent H and the drainage hole S, and eliminates the need for removal of the shavings, to improve work efficiency.

Figure 6:
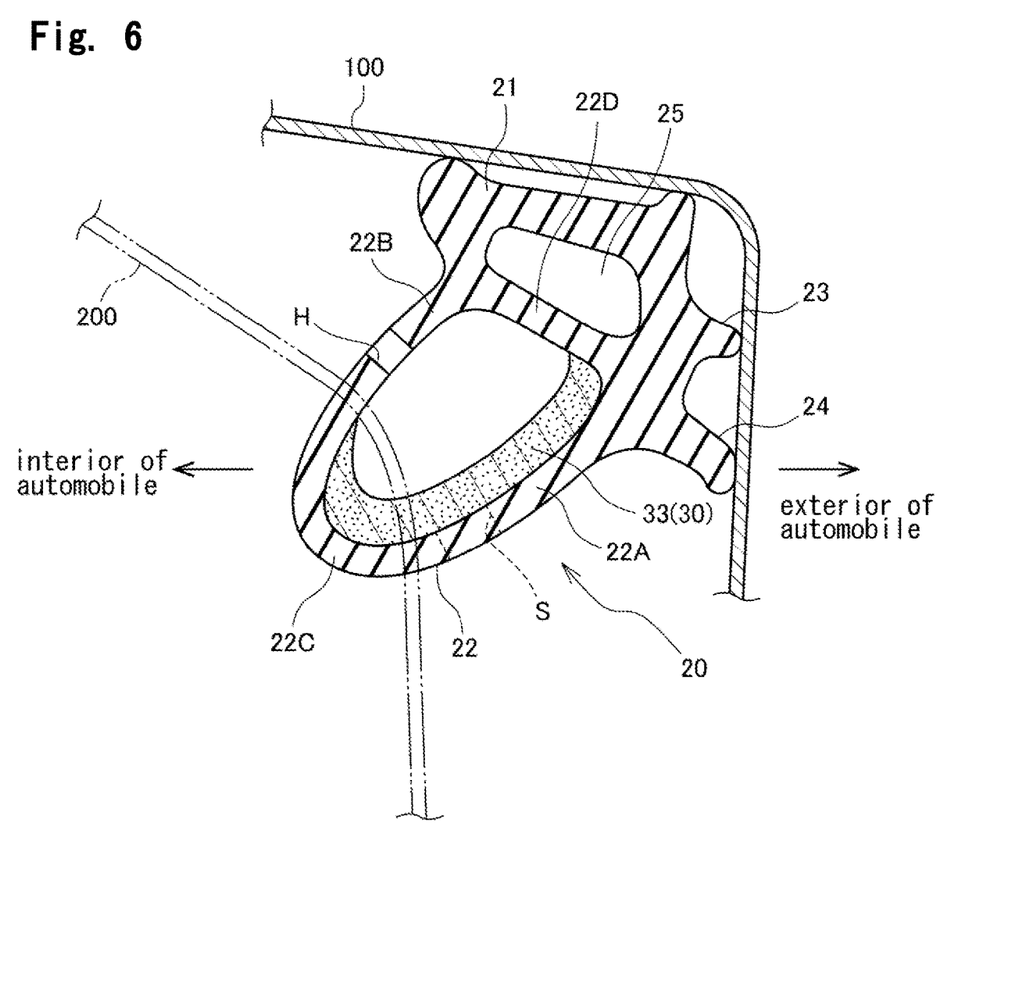
FIG. 6 is an enlarged vertical cross-sectional view of a door weather strip according to still another embodiment of the present invention for an automobile taken along line I-I in FIG. 8.

In this embodiment, the sponge layer 30 includes two sponge layers, the first and second sponge layers 31, 32. Alternatively, the sponge layer 30 may include only a third sponge layer 33 as illustrated in FIG. 6. Specifically, the third sponge layer 33 is provided on part of the inner peripheral surface of the hollow seal member 22 closer to the exterior of the automobile except the air vent H.

In the same manner as the first and second sponge layers 31, 32, the third sponge layer 33 has the specific gravity lower than the first, second, third, and fourth walls 22A, 22B, 22C, 22D. The third sponge layer 33 extends between where the first wall 22A connects with the fourth wall 22D and part of the second wall 22B closest to the third wall 22C of the hollow seal member 22 in cross section covering the first wall 22A and the third wall 22C. The third sponge layer 33 is formed by extrusion molding simultaneously with the door weather strip 20. A thickness of the third sponge layer 33 is gradually reduced toward the air vent H.

The third sponge layer 33 is provided on the inner peripheral surface of the hollow seal member 22 except the air vent H. This prevents increase in compressive load and degradation in door closability. Omission of the sponge layer 30 on the air vent H leaves no shavings when the air vent H is drilled.

The third sponge layer 33, which has the lower specific gravity, is provided where the drainage hole S is drilled. In general, a smaller number of the drainage holes S are provided than the air vents H. In addition, the drainage hole S can be punched with a punching blade after the door weather strip 20 is formed by extrusion molding, while the air vent H is drilled with a rotating drill that has a special shape simultaneously with the extrusion molding. The drainage hole S, punched on the soft sponge layer that has the lower specific gravity, easily has an improved quality of the shape. Punching the drainage hole S leaves less shavings than drilling holes with the drill, and merely necessitates removal of a punched part, and does not affect work efficiency.

In this embodiment, the clip fixes the door weather strip 20 on the door 100, and a vertical cross-sectional shape of the door weather strip 20 formed by extrusion molding is discussed. Alternatively, a double-sided tape may fix the door weather strip 20 on the door 100. Also, the present invention is applicable to the vertical cross-sectional shape of the door weather strip 20 that is fixed on a door sash 110 for use on a roof side part.

In addition, the third sponge layer 33 illustrated in FIG. 6 may be extended toward the second wall 22B (illustration omitted), to cover the inner peripheral surface of the fourth wall 22D in the same manner as FIG. 4.

Figure 10:
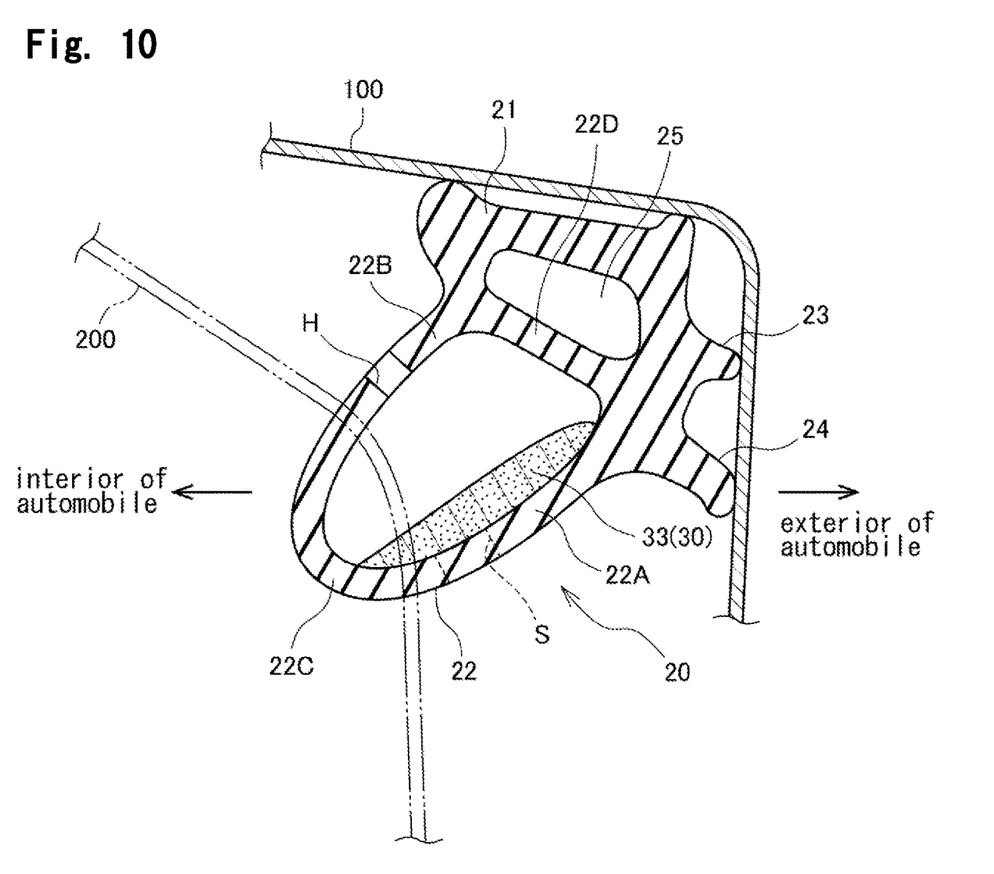
FIG. 10 is an enlarged vertical cross-sectional view of a door weather strip according to still another embodiment of the present invention for an automobile taken along line I-I in FIG. 8.

Alternatively, the third sponge layer 33 may be extended between part of the first wall 22A closest to the third wall 22C and part of the first wall 22A closest to the fourth wall 22D from the first wall 22A as illustrated in FIG. 10.

This prevents increase in load and degradation in door closability keeping noise insulation effect.

Figure 11:
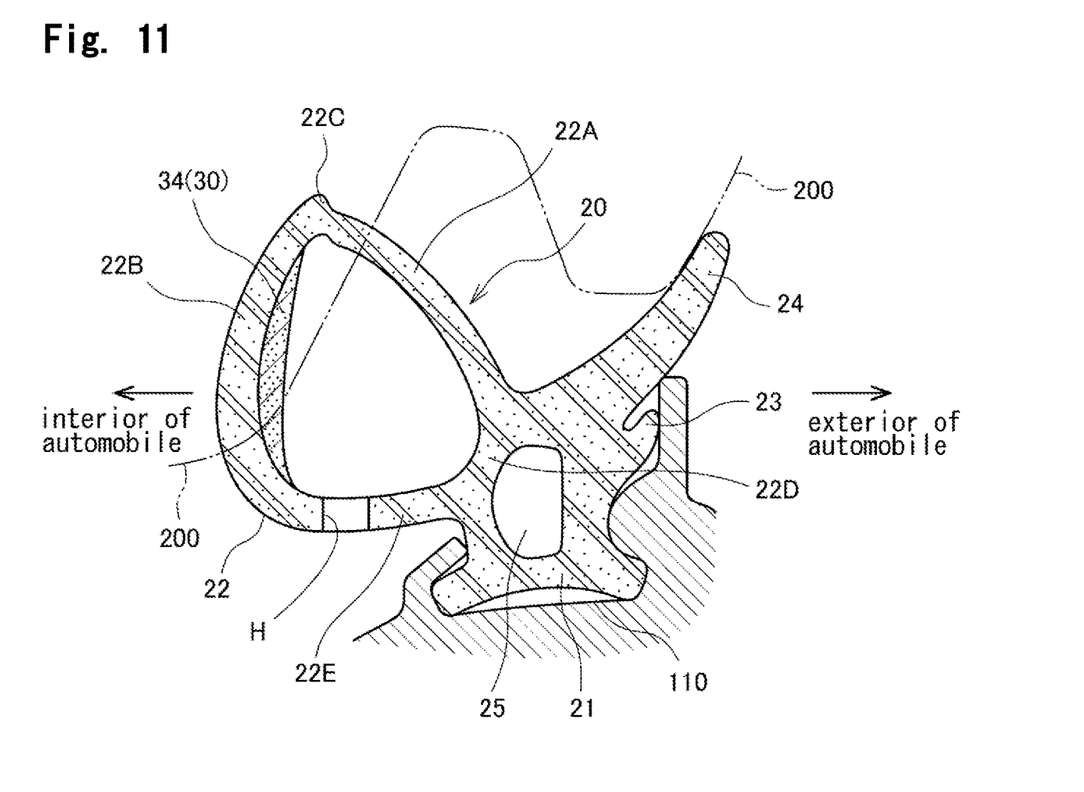
FIG. 11 is an enlarged vertical cross-sectional view of a door weather strip according to still another embodiment of the present invention for an automobile with the door in an opened position.
Figure 12:
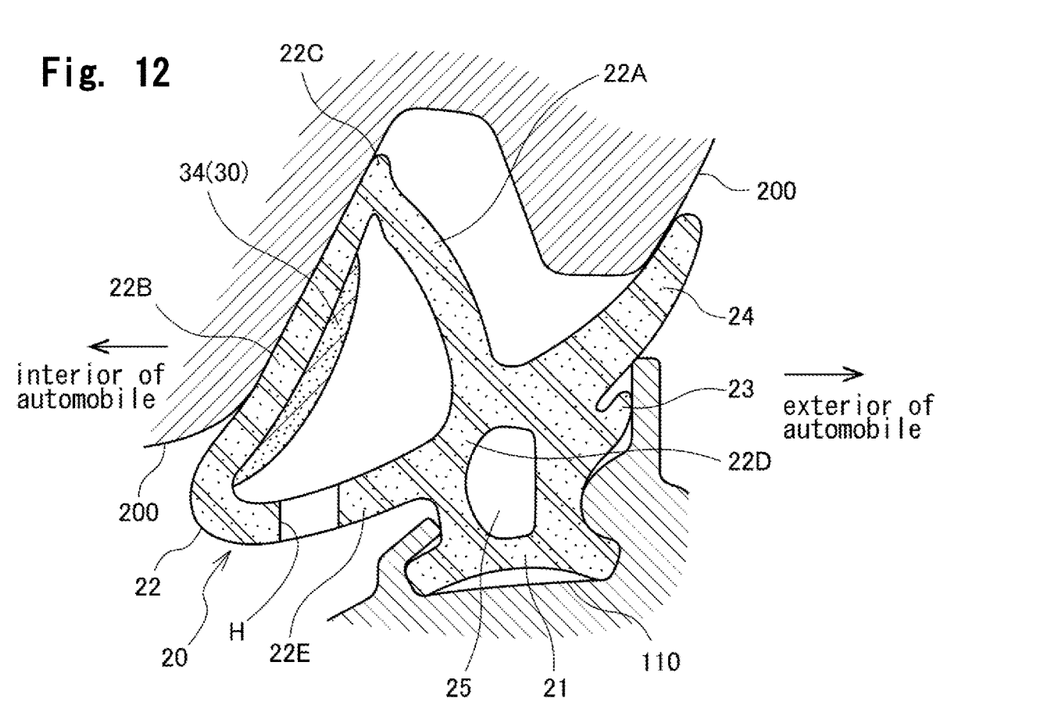
FIG. 12 is an enlarged vertical cross-sectional view of the door weather strip illustrated in FIG. 11 with the door in a closed position.

In this embodiment, the door weather strip 20 is fixed on the door 100 as illustrated in FIG. 1 to FIG. 10 with the clip, and the vertical cross-sectional shape of the door weather strip 20 formed by extrusion molding is discussed. The present invention is also applicable to the door weather strip 20 that is fixed on the door sash 110 for use on the roof side part as illustrated in FIG. 11 and FIG. 12. FIG. 11 illustrates the door weather strip 20 with the door 100 in an opened position. FIG. 12 illustrates the door weather strip 20 with the hollow seal member 22 making elastic contact with the automobile body 200 when the door 100 is in the closed position.

The door weather strip 20 includes the installation base member 21, the hollow seal member 22, the first and second lips 23, 24, and the hollow part 25.

As illustrated in FIG. 11, the hollow seal member 22 includes the first wall 22A, the second wall 22B, the third wall 22C, the fourth wall 22D, and a fifth wall 22E. The first wall 22A is curved to protrude toward the exterior of the automobile. The second wall 22B is curved to protrude toward the interior of the automobile. The third wall 22C connects the top ends of the first and second walls 22A, 22B. The fourth wall 22D connects with the base root of the first wall 22A. The fifth wall 22E connects base roots of the second and fourth walls 22B, 22D. The air vent H is provided on the fifth wall 22E.

A fourth sponge layer 34 is provided on the inner peripheral surface of the second wall 22B as illustrated in FIG. 12.

This prevents increase in load and degradation in door closability keeping noise insulation effect.

We claim:
1. A door weather strip for an automobile, the door weather strip being operably couplable to a flange of a door of the automobile, and the door weather strip comprising:
an installation base member operably couplable to the flange;
a hollow seal member integrally molded with the installation base member, the hollow seal member being configured to make elastic contact with an automobile body of the automobile when the door is in a closed position, the hollow seal member including a first wall curved toward an exterior of the automobile, a second wall curved toward an interior of the automobile, a third wall which connects top ends of the first and second walls, and a fourth wall which connects base roots of the first and second walls;
an air vent provided on the hollow seal member, and the air vent being configured to release air from the hollow seal member; and
a sponge layer provided on an inner peripheral surface of the hollow seal member except the air vent, and the sponge layer having a specific gravity lower than the first, second, third, and fourth walls,
wherein the air vent is provided on part of the second wall closer to the fourth wall than a middle of the second wall, and
the sponge layer is provided on the first wall, the third wall, and part of the second wall closer to the third wall than the middle of the second wall.

2. The door weather strip as claimed in claim 1, wherein a thickness of the sponge layer is gradually reduced toward the air vent or the drainage hole.

3. A door weather strip for an automobile, the door weather strip being operably couplable to a flange of a door of the automobile, and the door weather strip comprising:
an installation base member operably couplable to the flange;
a hollow seal member integrally molded with the installation base member, the hollow seal member being configured to make elastic contact with an automobile body of the automobile when the door is in a closed position, the hollow seal member including a first wall curved toward an exterior of the automobile, a second wall curved toward an interior of the automobile, a third wall which connects top ends of the first and second walls, and a fourth wall which connects base roots of the first and second walls;
an air vent provided on the hollow seal member, and the air vent being configured to release air from the hollow seal member;
a drainage hole provided on the hollow seal member, and the drainage hole being configured to drain water from the hollow seal member; and
a sponge layer provided on an inner peripheral surface of the hollow seal member except the air vent and the drainage hole, and the sponge layer having a specific gravity lower than the first, second, third, and fourth walls,
wherein the air vent is provided on part of the second wall closer to the fourth wall than a middle of the second wall, the drainage hole is provided on part of the first wall closer to the third wall than a middle of the first wall, and the sponge layer is provided on the third wall and part of the first wall closer to the fourth wall than the drainage hole.

4. The door weather strip as claimed in claim 3, wherein a thickness of the sponge layer is gradually reduced toward the air vent or the drainage hole.

* * * * *